June 27, 1950   A. H. STEWART   2,512,781
METHOD OF MAKING GLASS ARTICLES, SUCH AS BLOCKS
Filed March 13, 1946   3 Sheets-Sheet 1
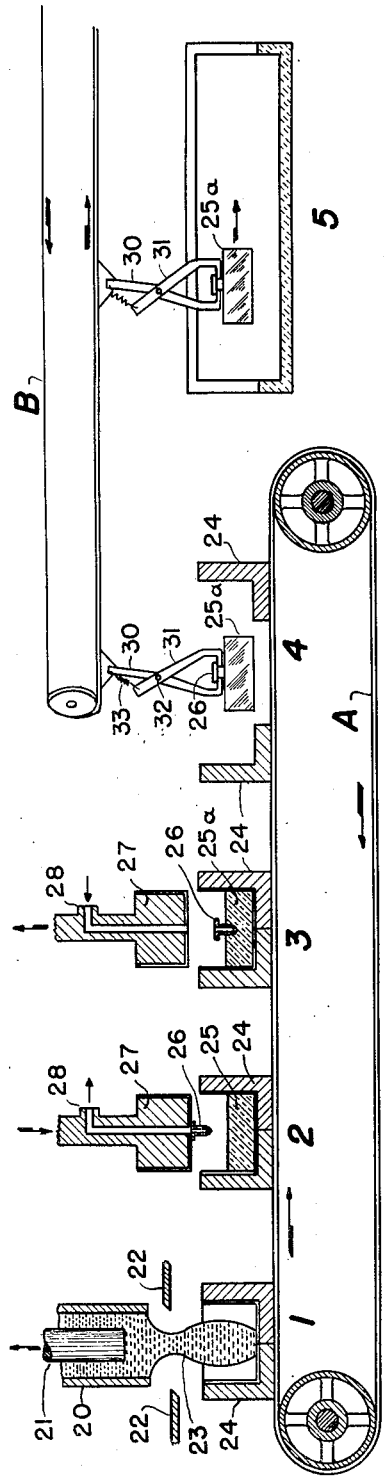
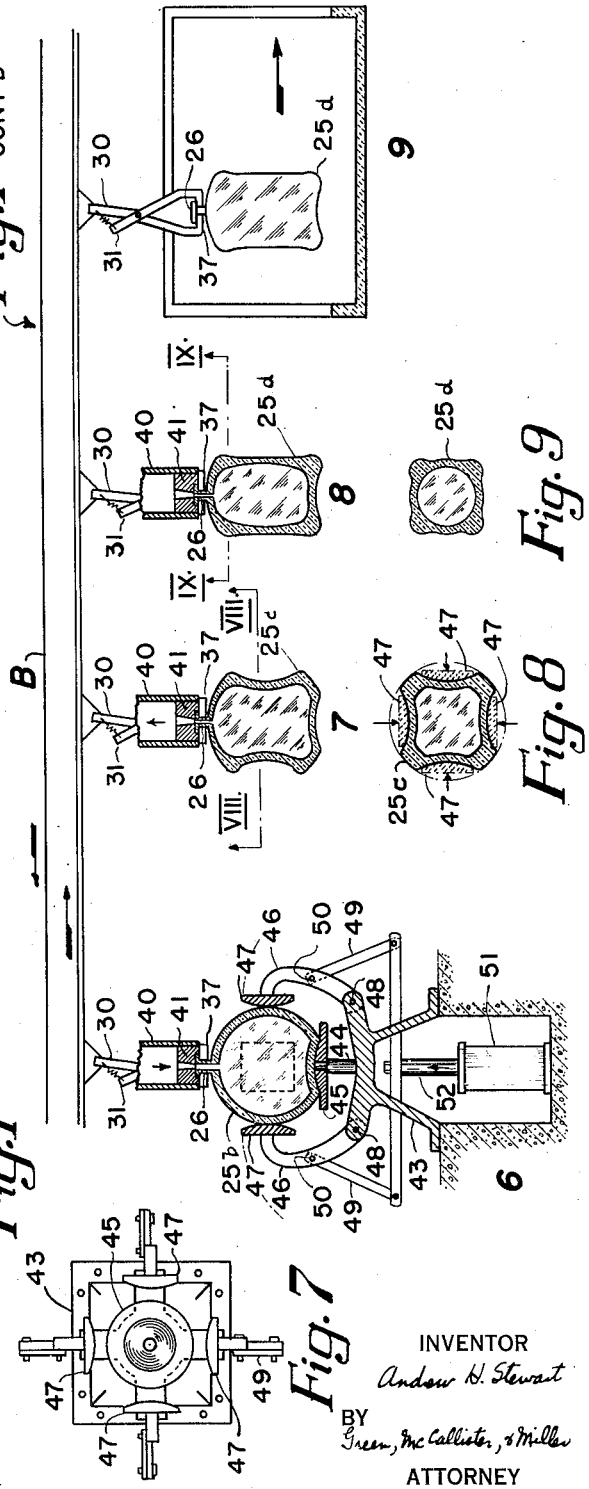

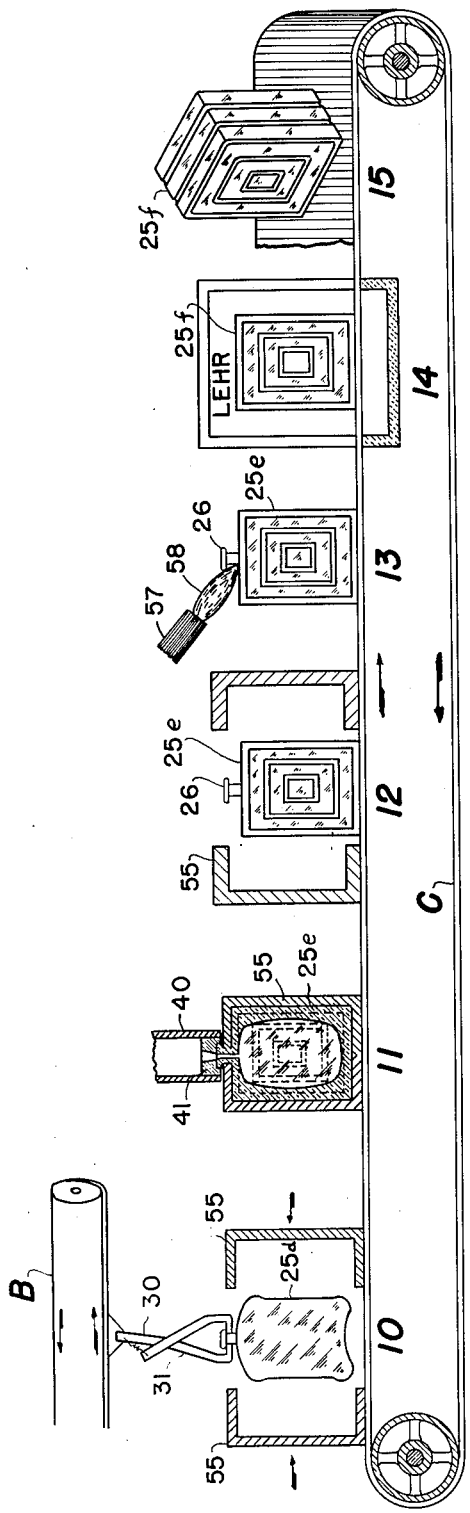

June 27, 1950     A. H. STEWART     2,512,781
METHOD OF MAKING GLASS ARTICLES, SUCH AS BLOCKS
Filed March 13, 1946     3 Sheets-Sheet 3
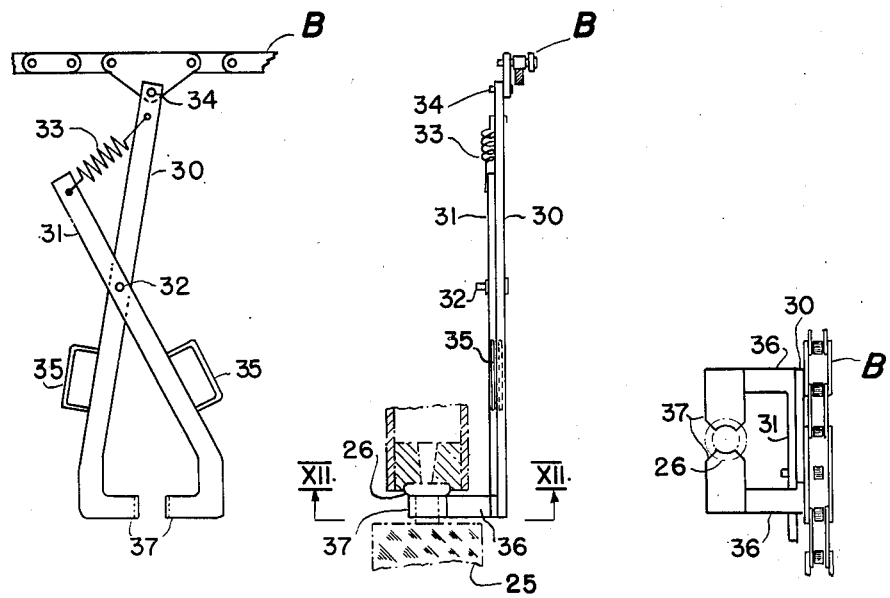
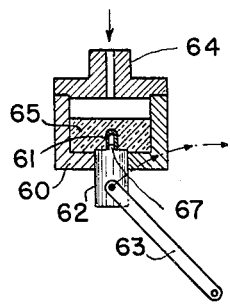
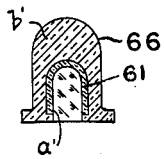
INVENTOR
Andrew H. Stewart
BY
Green, McCallister & Miller
ATTORNEYS Patented June 27, 1950

2,512,781

UNITED STATES PATENT OFFICE 2,512,781

METHOD OF MAKING GLASS ARTICLES, SUCH AS BLOCKS

Andrew H. Stewart, Beaver, Pa., assignor to The Phoenix Glass Company, a corporation of West Virginia Application March 13, 1946, Serial No. 654,061

14 Claims. (Cl. 49—80)

This invention pertains to the manufacture of glass and similar articles from vitreous, plastic or similar materials and more particularly to improved arrangements or procedure for making glass blocks and other articles.

Previous to the present invention, it has been common commercial practice to manufacture glass blocks and similar articles by, in a basic sense, utilization of pressing operations. I have found that there are certain factors that tend to mitigate against the use of blowing operations in this connection, e. g., relative cost, inability to obtain a product having desired characteristics of strength, utility and design.

After considerable research and experimentation and upon the basis of discoveries I have made, it is now possible and practical to manufacture blown glass blocks and other articles and particularly articles having structural use.

Another object has been to devise new and improved procedure for making shaped articles of vitreous or plastic materials.

Another object has been to develop procedure for improving strength, appearance, and other characteristics of a glass or similar article.

A fourth object has been to manufacture glass and similar articles of improved characteristics.

A still further object has been to develop practical procedure for blowing glass blocks and other articles.

These and many other objects of my invention will appear to those skilled in the art from the specification and drawings and the claims.

Figure 1 is a somewhat diagrammatical layout in side elevation illustrating a procedure for making articles in accordance with my invention.

Figure 2 is an enlarged section view in elevation of a form of tube that may be employed in blowing a shape in accordance with my invention.

Figure 3 is a vertical section view in elevation of a dual-wall shape blown by utilizing the tube of Figure 2.

Figure 4 is a view similar to Figure 2, but showing a modified form of blow tube.

Figure 5 is a view similar to Figure 3, but showing a partially dual-wall shape blown by utilizing the tube of Figure 4.

Figure 6 is a view similar to Figure 2, but illustrating a dual blow tube arrangement.

Figure 7 is a top plan view illustrating details of a device shown in step 6 of Figure 1.

Figure 8 is a top or lateral cross sectional view taken along the line VIII—VIII of the shape shown in step 7 of Figure 1, but showing depressers 47 at an "in" position.

Figure 9 is a view similar to Figure 8 taken along the line IX—IX of the shape shown at step 8 of Figure 1.

Figure 10 is an enlarged side view in elevation showing a detail of the finger conveyor B of Figure 1.

Figure 11 is a view in elevation and partial section taken at right angles to Figure 10, showing the device of Figure 10 in a carrying position with respect to the tube neck of a shape, see for example, step 6 of Figure 1 of the drawings.

Figure 12 is a bottom view taken along the line XII—XII of Figure 11.

Figure 13 is a sectional view in elevation taken along a preliminary or blank blow mold and showing a modified arrangement embodying my invention.

Figure 14 is a vertical view in section through a shape utilized in accordance with one phase of my invention.

Referring particularly to step 1 of Figure 1, I provide a hot charge 23 of the material by utilizing a suitable feeding mechanism, such as plunger 21, a feeder tube or orifice 20 and a pair of shears 22. It will be appreciated that any suitable form of feeding mechanism may be employed, such as, for example, a suction feeder. E. C. Steward Patent #2,010,334 of August 6, 1935, shows means that may be utilized in this connection.

The charge 23 may be, in accordance with my invention, fed into a sectional press mold 24. A preliminary shape 25 is then pressure-formed, by the utilization of a plunger 27. A tube 26 is shown vacuum-held on plunger 27 by connection 28. After the plunger moves into the charge, the vacuum may be released, or if desired, atmospheric or a positive air pressure may be applied through connection 28, in order to leave the tube 26 in the blank 25 when the plunger 27 is raised, see step 3 of Figure 1.

As shown in steps 2 and 3, a pipe or tube 26 is inserted in the preliminary shape 25a, preferably in a center point of the charge. The tube 26, in accordance with one phase of my invention, has a closed-off end which is forced or inserted into the charge and preferably is of the same material as the charge or shape with which it is to be used, that is, it will be a thermo-plastic if the charge is a thermo-plastic, or of glass if the charge is glass. The tube 26 is also preferably of a material having temperature coefficient characteristics substantially corresponding to the material of the charge. That is, it should preferably have substantially the same coefficient of expansion and contraction as the material of the preliminary shape 25a. When the tube 26 is positioned or inserted after a blank is formed, I preferably place it at a hotter or soft spot in the blank. If the object to be made requires an extension for holding it, its extending end is preferably flared to cooperate with or to be received by suitable carrying means. It will also be of some aid in making fluid connections thereto.

If a bottle, for example, is to be made, I prefer to have the (outer) open end of the tube overlaid by the charge to provide a better finish, see Figure 14 and the method of Figure 13. In such a case, such end of the tube need not be flared.

After the preliminary pressing operation, a shape carrier device, represented by fingers 30 and 31, is moved into position to grip the neck of the tube 26 while the press mold parts 24 are separated. The preliminary shape 25a is then carried by a continuous conveyor B to the next position from position 4, see Figure 1.

I have illustrated a continuous conveyor A for carrying the material during steps 1, 2 and 3 although any suitable type of mechanism can be employed, such as a rotating stand. The separable mold portions 24 are either moved laterally of the conveyor belt A, or the continuous finger conveyor B has a track which will enable the fingers 30—31 to carry the shape 25a laterally from between the separated mold parts, see step 4, to the next position of the operation.

The finger conveyor B may be employed to carry the preliminary shape 25a through a reheating oven or chamber, shown at step 5, and to a blow position shown as step 6. At the latter position, an air connection head 40, preferably having a suitable stopper of insulating material such as 41, is positioned or connected over the flange of the tube 26 to first introduce a positive air pressure through the tube to blow the shape 25a into a shape such as 25b. At position 6, the blow operation is preferably effected over a table 43 having an extension 44 that supports a suitable plate 45 of low heat conductivity, such as carbon or asbestos. The plate 45 serves to help position the blown shape 25b; the weight of the shape will cause the bottom of it to correspond to the abutting contour of the support plate 45.

After the shape 25b has been blown, a set of pressers 47 are actuated by any suitable means such as 51 to move them inwardly, preferably against four sides or localized areas of the shape, thus producing projecting portions or corners adjacent the localized areas or pressed-in wall portions and providing the latter with a concave contour and cooling them. Simultaneously with the pressing operation or preferably immediately thereafter, vacuum is applied through the connection 40 to draw in its adjacent or projecting portions about the previously depressed wall portions to further form the projecting portions or corners and to thicken them; compare the shape 25c, shown at step 7, to a shape 25d, shown at step 8. That is, vacuum pressure applied to the inside of the walls of the bottle or hollow shape will be more effective upon the adjacent or projecting portions or corners thereof due to the cooling action of the pressers 47. This results in a thickening of the adjacent or projecting portions, edges or corners as shown particularly at step 8. Step 7 of Figure 1 illustrates the shape or blank 25c after the pressing operation of step 6 and at the beginning or start of the vacuum operation. Step 8 of Figure 1 shows the resultant, somewhat elongated blank of less cross-sectional area 25d after the completion of such vacuum operation. It will be noted from a comparison of steps 6 to 8, inclusive, that the preliminary shape or parison 25b of step 6 has a much larger cross-sectional area than the depressed shape or parison of step 7 or the shape of step 8. The shape 25d may be then carried through a reheating oven 9 by the conveyor B after the air connection 40 has been removed. From the oven 9, the shape 25d is carried between a pair of open blow sections 55, see step 10. The blow mold 55, like the press mold 24, preferably opens and closes laterally outwardly across a continuous conveyor such as C, or the finger conveyor B moves the shape laterally into or out of a cooperating position with respect to the mold sections. The blow mold 55 is larger than the shape 25d; that is, the depressed or intermediate shape 25d is preferably smaller than the desired shape of the article.

The intermediate shape 25d, if structural articles such as glass blocks are to be made, may, if desired, be passed through the reheating oven of step 9 of Figure 1 and is then moved to position 10 and from position 10 to position 11 at which the blow mold sections are closed. A blow head 40 is connected and the shape is blown by applying fluid pressure to its internal walls; its final configuration corresponds to the configuration of inner walls of the blow mold. The operation at position 11 further strengthens and thickens the corner portions of the shape 25e. Steps 7, 8 and 11 thus strengthen what are normally the weaker portions of a shape.

Step 12 shows an article 25e after it has been blown and the partible mold sections have been separated. At step 13 the blow neck or tube 26 is removed by a searing nozzle 57 having a suitable flame 58. The opening in the shaped article 25e is also closed at the same time, if necessary, a piece of hot glass may be used.

After the final shape has been formed in the mold 55 and it has sufficiently cooled, a high degree of vacuum will be attained by reason of fact that the shape was sealed while hot.

After the operation at step 13, the belt C is employed to carry the closed-off shape 25f through an annealing lehr and to discharge it as a completed article at position 15. It will be noted that I prefer to so form the shape that the tube 26 is removed from a mounting or side face rather than front or back face of the block.

Referring to Figures 2 and 3, I have shown a tube 26 having a closed off end. As shown, the application of air pressure through the tube 26 after it has been positioned, as shown, for example, in step 3 of Figure 1, within a charge, causes the extending portion $a$ of the tube to be blown about the inner wall of the shape 25b, forming an inner layer $a'$ with the outer layer $b'$ of the main body of material of the blown shape 25b. In this manner I can obtain an improved article; for example, the outer layer of $b'$ may be of crystal glass and the inner, thinner layer may be of colored glass, such as ruby, green or blue, depending upon the color of the tube 26. This is an inexpensive way to produce articles having desired shades of color by utilizing various colored tubes. Different types of the same material, such as different kinds of glass, may be employed to produce desired characteristics in the resultant article.

In Figure 4, I have shown a tube 26' having a blow opening or slot extending therethrough. In other words, an unsealed tube. As shown in Figure 5, the blown shape 25b has a dual wall for a portion of its inner extent or periphery a' which corresponds to the material of the tube 26'. As a further modification, I may employ a plurality of tubes, one within another, to produce varied color and dual wall effects within a blown shape, see Figure 6. In this figure the inner tube is indicated as 26a and the outer tube as 26b. As will be appreciated by those skilled in the art any desired effect can be obtained by leaving one of the tubes open while keeping the other one closed, or vice versa, or by keeping both of them open or both of them closed. Except, where a multi-wall tube is employed, I prefer to provide a space between the tube walls to permit the hot material of the charge to heat the inner tube and force out air, see Figure 6.

Details of a suitable outer wall depressing mechanism that may be employed in connection with my invention have been shown at step 6 of Figure 1 and in Figure 7. A suitable type of motor or presser such as pneumatic cylinder 51, is shown as connected by shaft 52 to a crosshead lever system 49 which in turn is pivotally connected at 50 to arms 46 which support the pressers 47. The arms 46 are at their lower ends pivotally positioned at 48 on the support stand 43.

In Figures 10, 11 and 12, I have shown details of a suitable finger carrier device that may be employed to support the shape during various steps of the operation. The device comprises a pair of scissor arms 30 and 31 pivoted at 32 and normally forced towards a closed position by a spring 33; handles 35 extend from each scissor arm for opening them away from the shape. As shown particularly in Figure 11, the arms 30 and 31 each carry lateral extensions 36 having semicircular shaped neck supporting and engaging segmental faces 37 that are preferably provided with some suitable insulating material. That is, the faces 37 support the shape 25 at the neck and below the flange of the tube 26. The carrier device is supported from conveyor B by pin 34. In Figure 8, the depressers are shown at their inner positions, changing shape 25b to 25c.

I have also disclosed ovens located along the line for reheating the shape or charge between forming operations as may be necessary depending upon the speed of the operations and the temperatures involved.

The depressers 47 are preferably lined with some suitable insulating or protective material, such as carbon, to prevent injury to the shape being formed. They may have flat or curved surfaces, although the latter are preferable.

I preferably depress or retract the shape 25c so that it is decreased in size at steps 6 and 7 and is small enough to be placed within the final mold 55. Reheating by ovens is employed to eliminate any marks of the pressers or depresser 47, as well as to facilitate subsequent operations. The operation of the depressers reduces the tendency to blow side walls of the shape in the final blow mold of heavier thickness than the corners and outside edges. Normally, without the depressing operation, the edges or corners of the shape are too thin to provide a practical form of article and center portions are thicker than the corners.

As will be appreciated, the process or procedure is not limited to glass bricks or blocks but may be employed for the manufacture of any suitable article such as glass banks, lamp bodies, etc., where the articles are not necessarily rectangular or square in shape. The process is particularly applicable where certain portions of the walls of the shape are to be strengthened relatively to other portions thereof. The process may be also used in making shapes, such as perfume bottles, in which case the tube 26 will be embedded in and form the inner wall or portion of the shape, depending upon whether or not a closed tube is used. Where varied wall thicknesses are unimportant, the steps to produce more uniform wall thickness can be omitted. I also contemplate insertion of more than one tube in the preliminary shape 25 to produce two or more hollow portions in one article. The tube can also be inserted in blank molds for producing machine-made ware where the charge of glass is depressed directly into the mold or the tube is first inserted in a vacuum mold.

In Figure 13, I have shown an arrangement such that the charge may be dropped into a partible blank mold 60 over a tube 61 that has been previously positioned on a stationary support or plunger 62 within the mold. A blow head 64 is then positioned over the mold (or, if desired, a plunger) to force the charge by positive pressure within the mold to form a blank. After the blank 65 is formed and the material of the charge is forced about the tube 61, the mold sections are opened to permit the carrier-plunger 62 to swing on arm 63 and move the blank, as shown by the arrow, to a blowing position. Figure 14 shows how a tube 61 may be used with a preliminary blown shape 66 having an inner layer a' of the material of the tube and an outer layer b' of the material of the charge. Although I have shown a projection 67 on the carrier 62 for supporting the tube 61, I also contemplate holding it by vacuum pressure on plunger 62 in a manner similar to plunger 27 of Figure 1.

When a bottle is blown utilizing a colored tube, the neck will have an intense shade while the walls will have a more diffused, lighter, or delicate shade. The embodiment of Figure 13 is particularly suitable for making bottles, jars and similar blown shapes. I prefer a closed end tube for making a structural shape such as a brick. Where an open end tube is to be vacuum-held at step 2 of Figure 1, I provide fluid passageways through the plunger 27 to the upper face of the flange portion thereof.

Although I prefer to provide a preliminary shape, as distinguished from a final shape by a pressing or depressing operation, it will be apparent that various steps may be omitted or additional steps added without departing from the spirit and scope of the invention. However, I do prefer to employ a depressing operation and then a blowing operation in sequence to effect the thickening of certain wall portions as above indicated. The strengthening of certain portions of the block is highly advantageous where the article is to be used structurally, for example, as a glass block. My invention is not limited to any particular apparatus in its utilization and it will be apparent that other suitable apparatus may be employed in accordance with the teaching thereof.

It will be apparent to those skilled in the art that various other arrangements, modifications, substitutions, additions and combinations thereof may be made in the procedure and apparatus for effecting the procedure of my invention without departing from the spirit and scope thereof as indicated in the appended claims.

What I claim is:

1. In a procedure for manufacturing a hollow shaped vitreous or plastic article from a material having characteristics of plasticity under conditions of heat, the steps of forming a hot charge of the material into a hollow parison, depressing a localized portion of a side wall of the parison about adjacent portions of such side wall and forming adjacent projecting portions, and then depressing the adjacent projecting portions about the previously depressed portion; the whole being effected in such a manner as to thicken the adjacent projecting portions.

2. In a procedure for manufacturing a hollow shaped vitreous or plastic article from a material having characteristics of plasticity under conditions of heat, the steps of forming a hot charge of the material into a hollow parison, depressing a central body portion of a wall of the parison about adjacent portions of such wall and forming adjacent corner portions, and then depressing the adjacent corner portions about the previously depressed central body portion; the whole being effected in such a manner as to strengthen the adjacent corner portions.

3. In a procedure for manufacturing a hollow shaped vitreous or plastic article from a material having characteristics of plasticity under conditions of heat, the steps of forming a hot charge of the material into a hollow parison, depressing and cooling a central body portion of a wall of the parison about adjacent portions of such wall and forming adjacent corner portions, and then drawing the adjacent and hotter corner portions inwardly about the cooled and depressed central body portion; the whole being effected in such a manner as to strengthen the adjacent corner portions.

4. A procedure as defined in claim 3 wherein, the central body portion of the wall of the parison is depressed and cooled by applying a presser thereto, and the adjacent and hotter corner portions are drawn inwardly by applying a vacuum pressure internally of the hollow parison.

5. In a procedure for manufacturing a hollow shaped article from a vitreous or similar material having characteristics of plasticity under conditions of heat, the steps of forming a hot charge of the material into a hollow parison, depressing opposite body portions of a wall of the parison about adjacent portions thereof and forming adjacent corner portions, and then depressing the adjacent corner portions about the opposite body portions while the opposite body portions are at a lower temperature than the adjacent corner portions, and subsequently expanding the parison into a desired article.

6. In a procedure for manufacturing a hollow shaped vitreous or plastic article from a material having characteristics of plasticity under conditions of heat, the steps of forming a hot charge of the material into a hollow parison of a substantially rounded shape, pressing-in and cooling rounded central body portions of the parison from a plurality of sides of the parison about adjacent portions of the wall thereof and forming adjacent corner portions, and then drawing-in the adjacent corner portions about the pressed-in central body portions; the whole being effected to strengthen the adjacent corner portions.

7. In a procedure as defined in claim 6, the the step of subsequently blowing and expanding the parison into the desired article.

8. In a procedure for manufacturing a hollow shaped vitreous or plastic article from a material having characteristics of plasticity under conditions of heat, the steps of forming a hot charge of the material into a hollow parison, forcing side portions of a wall of the parison inwardly about adjacent portions thereof and forming the adjacent portions into corner portions, moving the corner portions about the side portions and thickening the corner portions, and pressure-expanding the parison into the desired article.

9. In a procedure for manufacturing a hollow shaped vitreous or plastic article from a material having characteristics of plasticity under conditions of heat, the steps of inserting an end of a hot plastic-like tube of the material into a hot charge of the material to be shaped, directly blowing the charge up through the tube into a hollow parison, depressing portions of the wall of the parison about adjacent wall portions thereof and forming projecting wall portions, depressing the projecting wall portions about the first-mentioned depressed portions, and blowing the depressed parison through the tube into a desired shape of article.

10. A procedure as defined in claim 9 wherein, a multi-wall hot tube of the material is pressed into the hot plastic-like charge of the material.

11. In a procedure for manufacturing a hollow shaped vitreous or plastic article from a material having characteristics of plasticity under conditions of heat, the steps of inserting an end of a hot plastic-like tube of the material into a hot plastic-like charge of the material to be shaped, and then directly blowing the charge up through the tube into a hollow parison, depressing portions of the wall of the parison about adjacent wall portions thereof and forming projecting wall portions, depressing the projecting wall portions about the first-mentioned depressed portions, blowing the depressed parison through the tube into the desired shape of article, fusing over the opening through the tube, removing an extending end of the tube, and annealing the article.

12. In a procedure for manufacturing a multi-layer, hollow shaped vitreous or plastic article from a material having characteristics of plasticity under conditions of heat, the steps of inserting an end of a composite dual-wall hot tube of the material having an inner wall defining a blow cavity and having an outer enclosing wall into a hot charge of the material, and directly blowing the charge through the blow cavity of the tube into a hollow shape having layers corresponding to the hot charge of the material, the outer enclosing wall of the tube, and the inner wall of the tube.

13. A procedure as defined in claim 12 wherein, the inner wall of the tube has a closed inner end, and the closed inner end of the tube is inserted into the hot charge of the material.

14. A procedure as defined in claim 12 wherein, the inner wall of the tube has an open inner end, and such open inner end of the tube is inserted into the hot charge of the material.

ANDREW H. STEWART.

REFERENCES CITED

The following references are of record in the file of this patent:

UNITED STATES PATENTS

| Number | Name | Date |
|---|---|---|
| 172,946 | Atterbury | Feb. 1, 1876 |
| 189,180 | Bourne | Apr. 3, 1877 |
| 260,819 | Arbogast | July 11, 1882 |
| 343,823 | Libbey | June 15, 1886 |
| 725,497 | Sievert | Apr. 14, 1903 |
| 760,150 | Richardson, Jr. | May 17, 1904 |
| 1,016,832 | Jung | Feb. 6, 1912 |
| 1,061,405 | Rau | May 13, 1913 |
| 1,230,368 | Barber, Jr. | June 19, 1917 |
| 1,266,786 | Finkbeiner | May 21, 1918 |
| 1,413,169 | Lawton | Apr. 18, 1922 |
| 1,635,704 | Canfield | July 12, 1927 |
| 1,752,481 | Garwood | Apr. 1, 1930 |
| 2,329,136 | Poglein | Sept. 7, 1943 |
| 2,336,822 | Wadman | Dec. 14, 1943 |